United States Patent
Hammarlund et al.

(10) Patent No.: US 7,457,932 B2
(45) Date of Patent: Nov. 25, 2008

(54) LOAD MECHANISM

(75) Inventors: Per Hammarlund, Hillsboro, OR (US); Stephan Jourdan, Portland, OR (US); Michael Fetterman, Hillsboro, OR (US); Glenn Hinton, Portland, OR (US); Sebastien Hily, Hillsboro, OR (US); Ronak Singhal, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 356 days.

(21) Appl. No.: 11/323,000

(22) Filed: Dec. 30, 2005

(65) Prior Publication Data

US 2007/0156990 A1    Jul. 5, 2007

(51) Int. Cl.
*G06F 12/00*    (2006.01)

(52) U.S. Cl. ...................................... 711/167

(58) Field of Classification Search ................ None
See application file for complete search history.

(56) References Cited

U.S. PATENT DOCUMENTS

| 5,896,505 | A | * | 4/1999 | Shimazaki | .................. 709/213 |
| 2004/0148490 | A1 | * | 7/2004 | Anderson et al. | ............. 712/24 |
| 2004/0212623 | A1 | * | 10/2004 | Yi et al. | ...................... 345/531 |

* cited by examiner

*Primary Examiner*—Hiep T Nguyen
(74) *Attorney, Agent, or Firm*—Blakely, Sokoloff, Taylor & Zafman LLP

(57) ABSTRACT

A method is disclosed. The method includes scheduling a load operation at least twice the size of a maximum access supported by a memory device, dividing the load operation into a plurality of separate load operation segments having a size equivalent to the maximum access supported by the memory device, and performing each of the plurality of load operation segments. A further method is disclosed where a temporary register is used to minimize the number of memory accesses to support unaligned accesses.

25 Claims, 4 Drawing Sheets

LOAD MECHANISM

FIELD OF THE INVENTION

The present invention relates to computer systems; more particularly, the present invention relates to central processing units (CPUs).

BACKGROUND

Vector processors are designed to operate simultaneously on a collection of data items that are arranged in a "vector" having a specific vector length (VL). A vector processor typically relies on internal data path that may or may not have the same width as the vector length. Recently 256 bit ("b") data width processors have been designed, replacing 128 b systems. In such processors, the execution data path may not match a maximum vector length (VL) (e.g., 256 b path for a maximum VL of 512 b).

To perform the operation for a full vector length instruction (VSSE), the instruction may be broken into a set of operations working on subsets of the data inputs. For instance, a VSSE instruction for a vector length of 512 b may be decoded into two micro operations (μops) when fetched by a microprocessor, each μop being able to operate on 256 b of data.

However, all VSSE operations may not be performed on the full 512 b vector length. When the vector length is not equal to the max VL, a suitably smaller set of operations will be executed. Deciding how many micro operations will be executed is performed by an instruction decoder within the processor.

DESCRIPTION OF THE DRAWINGS

The invention is illustrated by way of example and not limitation in the figures of the accompanying drawings, in which like references indicate similar elements, and in which.

DETAILED DESCRIPTION

Figure 1:
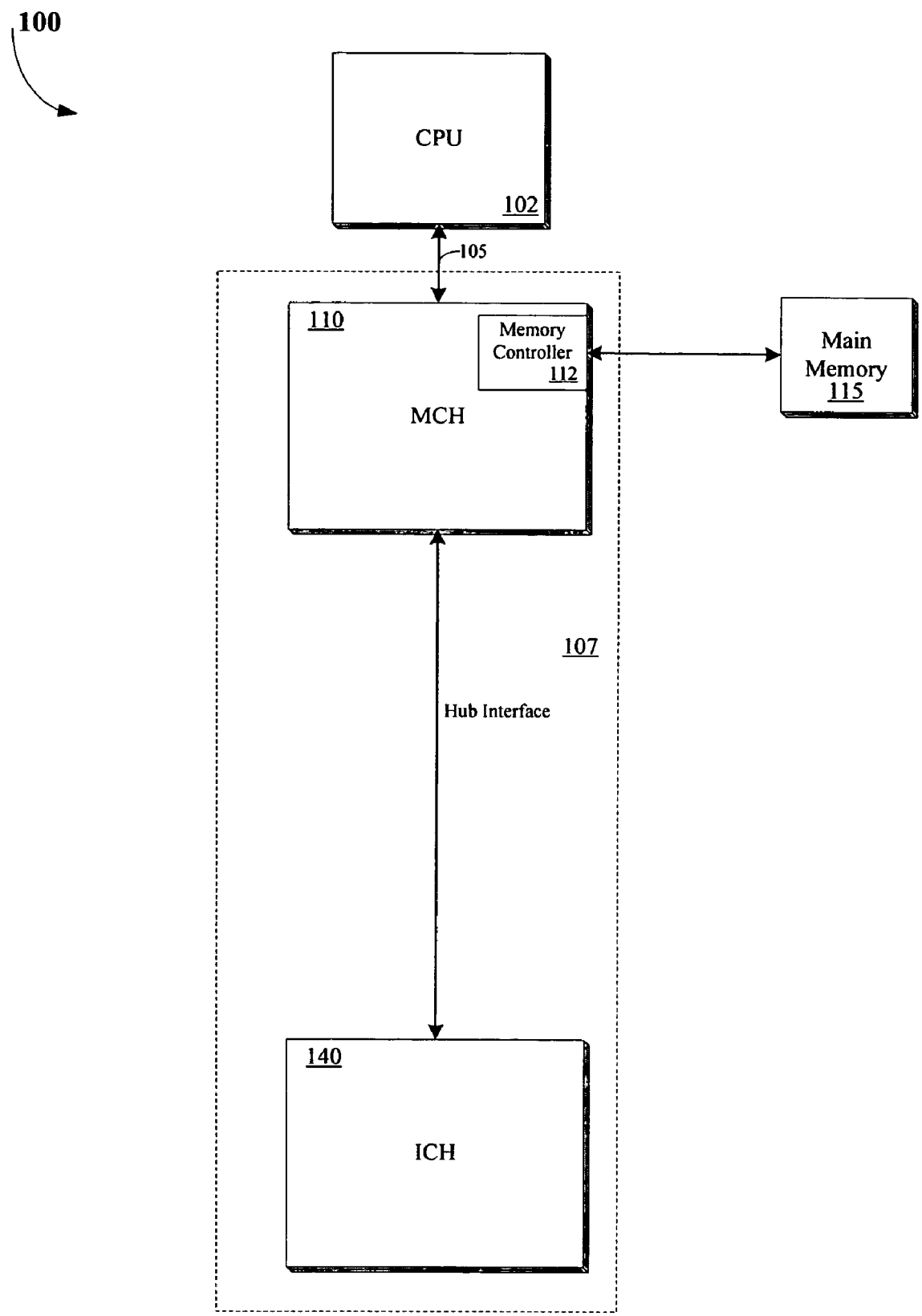
FIG. 1 is a block diagram of one embodiment of a computer system.

A mechanism to perform aligned and unaligned load operations in a CPU is described. In the following detailed description of embodiments of the invention, numerous specific details are set forth in order to provide a thorough understanding of embodiments of the present invention. However, it will be apparent to one skilled in the art that embodiments of the present invention may be practiced without these specific details. In other instances, well-known structures and devices are shown in block diagram form, rather than in detail, in order to avoid obscuring embodiments of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

The instructions of the programming language(s) may be executed by one or more processing devices (e.g., processors, controllers, control processing units (CPUs)).

FIG. 1 is a block diagram of one embodiment of a computer system 100. Computer system 100 includes a central processing unit (CPU) 102 coupled to bus 105. A chipset 107 is also coupled to bus 105. Chipset 107 includes a memory control hub (MCH) 110. MCH 110 may include a memory controller 112 that is coupled to a main system memory 115. Main system memory 115 stores data and sequences of instructions that are executed by CPU 102 or any other device included in system 100.

In one embodiment, main system memory 115 includes dynamic random access memory (DRAM); however, main system memory 115 may be implemented using other memory types. Additional devices may also be coupled to bus 105, such as multiple CPUs and/or multiple system memories. MCH 110 is coupled to an input/output control hub (ICH) 140 via a hub interface. ICH 140 provides an interface to input/output (I/O) devices within computer system 100.

Figure 2:
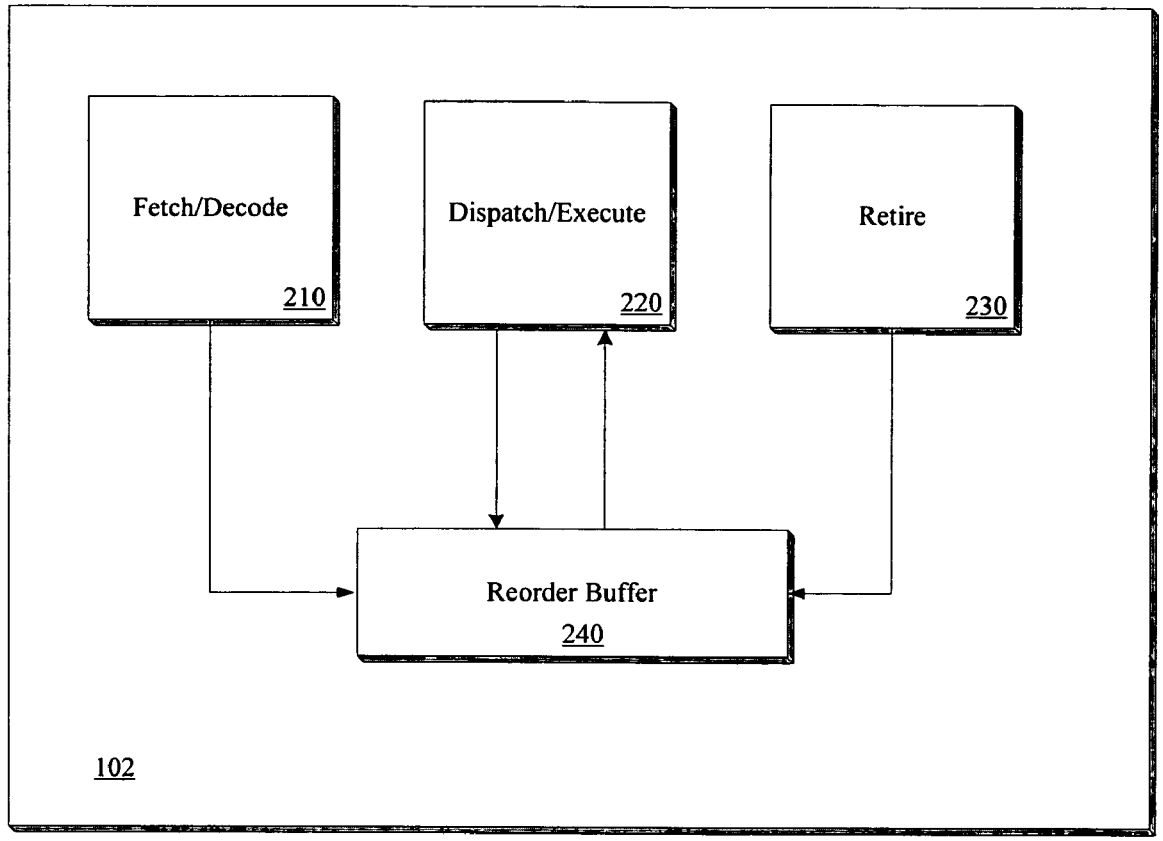
FIG. 2 illustrates a block diagram of one embodiment of a CPU.

FIG. 2 illustrates a block diagram of one embodiment of CPU 102. CPU 102 includes fetch/decode unit 210, dispatch/execute unit 220, retire unit 230 and reorder buffer (ROB) 240. Fetch/decode unit 210 is an in-order unit that takes a user program instruction stream as input from an instruction cache (not shown) and decodes the stream into a series of micro-operations (µops) that represent the dataflow of that stream. In other embodiments, the fetch/decode unit 210 may be implemented in separate functional units or may include other functional units, such as a dispatching unit.

Dispatch/execute unit 220 is an out of order unit that accepts a dataflow stream, schedules execution of the uops subject to data dependencies and resource availability and temporarily stores the results of speculative executions. In other embodiments, the dispatch/execute unit 220 may be separate functional units, or include other functional units, such as a retire unit.

Furthermore, in other embodiments, the dispatch/execute unit 220 may perform in-order operations in addition to or instead of out-of-order operations. Retire unit 230 is an in order unit that commits (retires) the temporary, speculative results to permanent states. In some embodiments, the retire unit 230 may be incorporated with other functional units.

Figure 3:
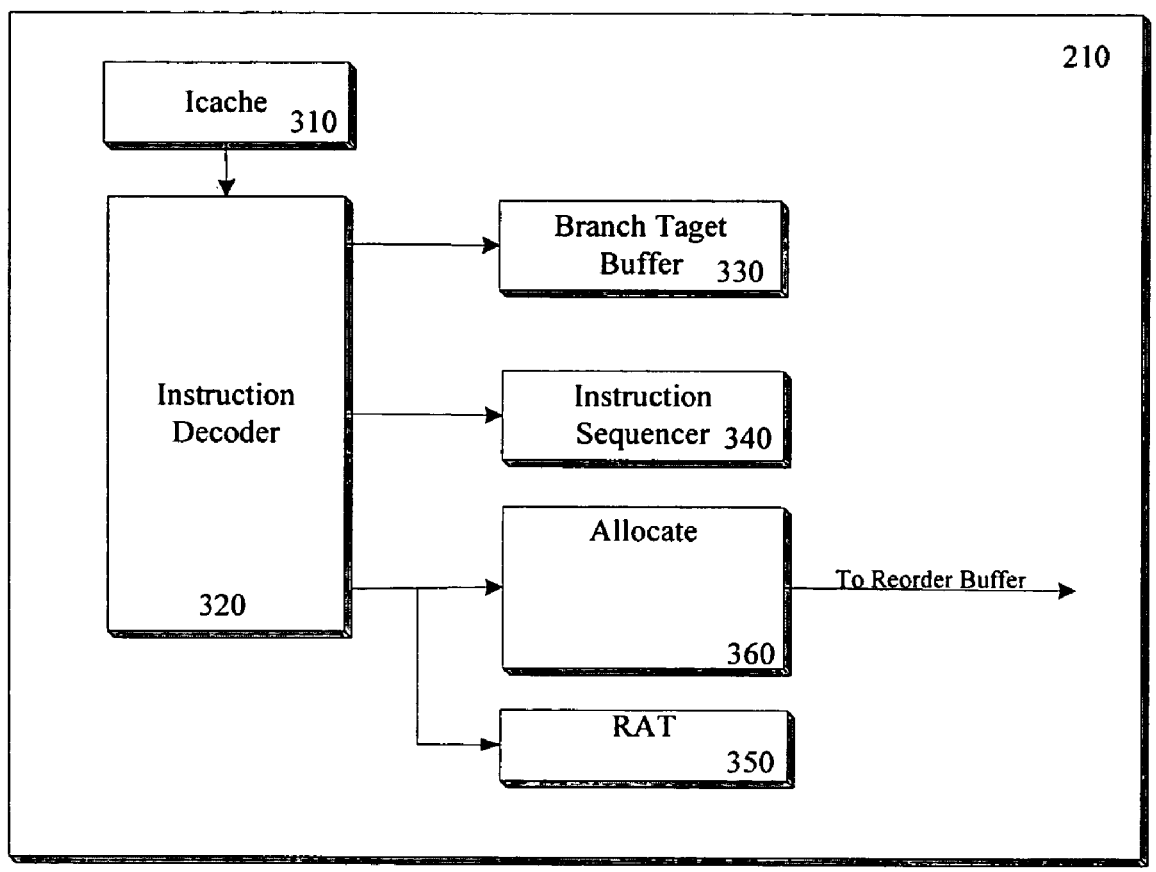
FIG. 3 illustrates a block diagram of one embodiment of a fetch/decode unit.

FIG. 3 illustrates a block diagram for one embodiment of fetch/decode unit 210. Fetch/decode unit 210 includes instruction cache (Icache) 310, instruction decoder 320, branch target buffer 330, instruction sequencer 340 and register alias table (RAT) 350. In one embodiment, Icache 310 is a local instruction cache that fetches cache lines of instructions based upon an index provided by branch target buffer 330.

In the embodiment illustrated in FIG. 3, instructions are presented to decoder 320, which decodes the instructions into µops. Some instructions are decoded into one to four µops using microcode provided by sequencer 340. Other instructions may be decoded into a different number of µops.

In one embodiment, decoder 320 may receive 512 b VSSE instructions. The VSSE instructions are able to operate on up to 512 b vector lengths. Decoder 320 uses the instruction and the VL to generate a suitable number of micro operations that each operate on up to 256 b. For example, if VL is 512 b, decoder 320 will generate two 256 b micro operations. In a further example, if VL is 256 b, a single 256 b micro operation is generated.

In one embodiment, decoder 320 may generate 256 b operations when VL is a multiple of 256. In such an embodiment decoder 320 may generate a sequence of 128 b or smaller operations when the VL is not a multiple of 256 b. For example, if VL is 384, decoder 320 may generate three 128 b operations. In other embodiments, the exact number of micro operations that is generated for each value of VL is an implementation optimization that can be performed to varying degrees.

According to one embodiment, the decoded µops are queued and forwarded to RAT 350 where register references are converted to physical register references. The µops are subsequently transmitted to ROB 240. In addition, the µops are forwarded to allocator 360, which adds status information to the µops regarding associated operands and enters the µops into the instruction pool. Allocator 360 may further allocate processor resources, e.g. registers and load buffers, to the micro operations.

Figure 4:
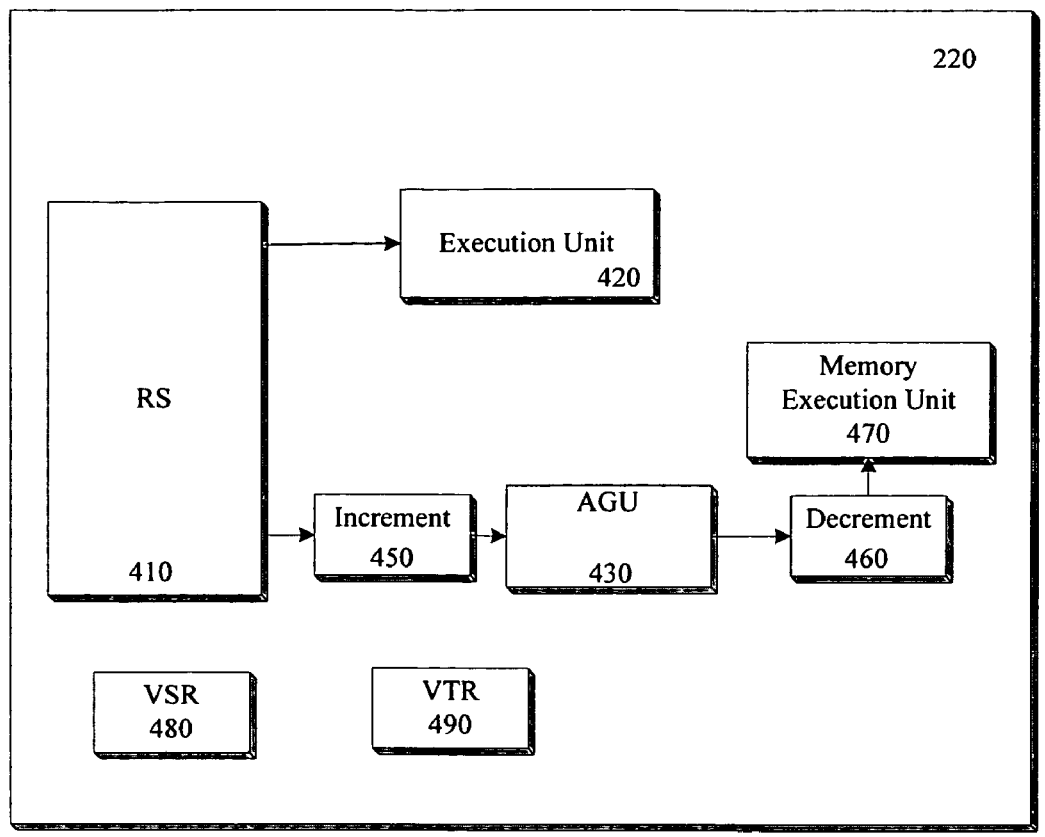
FIG. 4 illustrates a block diagram of one embodiment of a dispatch/execution unit.

FIG. 4 illustrates a block diagram for one embodiment of dispatch/execute unit 220. Dispatch/execute unit 220 includes a reservation station (RS) 410, execution unit 420 and Address Generation Unit (AGU) 430. In one embodiment, execution unit 420 and AGU 430 may be included within the same unit. However, execution unit 420 and AGU 430 are shown separately in FIG. 4 to provide clarity.

RS 410 selects µops from the instruction pool depending on status. If the status of a µops indicates that the µops has all of its operands, RS 410 checks to see if an execution resource at execution unit 420 needed by the µop is available. If both conditions are true, RS 410 forwards the µop to execution unit 420 or AGU 430 where it is executed. RS 410 may track dependencies between 256 b operations without taking into account the dependencies of the original 512 b VSSE vector instructions.

AGU 430 computes the addresses for memory accesses (e.g., loads and stores) and a Memory Execution Unit (MEU) 470 will perform the memory accesses. While execution unit 420 is capable of handling 256 b VL operations, MEU 470 may be implemented as a unit that accesses memory in smaller quantities, for example 128 b. For example, in an embodiment where MEU 470 accesses memory in 128 b quantities and load operations are decoded as 256 b at decoder 320. Note that the 256 b load µop will be executed twice in MEU 470 to generate the full 256 b of data.

AGU 430 generates one address for one of the 128 b components. Further, an incrementer and/or decrementer may be used to add/subtract 16 to generate the address of the other 128 b component. In one embodiment, the 128 b component with the higher address is accessed first. Accordingly, a decrementer 460 is used to generate the lower address.

In another embodiment, the 128 b component with the lower address is accessed first. In such an embodiment, an incrementer 450 is used to generate the higher address. In yet another embodiment, it may be beneficial to decide which component should be accessed first depending on other dynamically detectable constraints. Further, incrementer 450 is used to add 32 to the address of the load for the second 256 b operation.

In an embodiment implementing a 128 b MEU 470, the two 256 b operations will generate four memory accesses to the MEU 470. In such an embodiment, the addresses: A, A+16, A+32, and A+48 are to be generated. Incrementer 450 and decrementer 460 are used to generate these addresses. In another embodiment, implementing a MEU 470 of width 64B, the addresses: A, A+8, A+16, A+24, A+32, . . . , are generated in a similar way with incrementer 450 and decrementer 460.

Moreover, each 256 b load is performed twice in the memory system, once for each 128 b segment. Since the base memory system can perform 128 b load operations, the 256 b load operations generate two 128-bit memory accesses. As a result, each 256-bit load occupies one ROB 240, one RS 421 entry, and two load buffers (LBs) in cache/memory (one for ADDR and one for ADDR +16).

For one 512 b load instruction, RS 410 includes two 256 b load µops that will access address A and address A+32. The 256 b load µops are scheduled once from RS 410 and executed twice in AGU 430, once for each 128 b component. In one embodiment, for each 256 b µops, the AGU 430 computes the address of the second 128 b component first, A+16 and A+48, and accesses the memory system with those addresses. Subsequently, decrementer 460 is used to compute the lower addresses A and A+32 for accesses in the other 128 b components. Whether the lower or the higher address is accessed first for a 256 b load μop is an implementation optimization as described above.

In one embodiment, the addresses A and A+16 for a 256 b load μop may be calculated in parallel and written into the load buffer entry with two write ports. In such an embodiment, the first 128 b component is immediately used to access memory, and the second 128 b component is re-executed from the MEU 470 load buffer to access the second part.

In another embodiment, AGU 430 computes the address for the first 128 b component and inserts a bubble (e.g., a single clock where the RS 410 cannot schedule another operation) and immediately computes the address of the second component. In this embodiment, the first and the second component are accessed in consecutive cycles. Further, in this embodiment, the addresses may be written into the load buffer using a single write port. Further, for these two different embodiments, the memory access for either the higher or lower address of the 128 b components may be computed and executed first.

In any of the above described embodiments, each of the 128 b accesses are independent and may complete in any order. Here, memory coherency checking uses the MEU 470 checking mechanism that works on up to 128 b chunks of memory. The memory coherency checking may be arranged as either 128 b or 256 b checks depending on the underlying hardware.

In an embodiment where MEU 470 can handle 128 b memory accesses, another problem encountered for 256 b load operations is that the load write-back busses to, for example, execution unit 420 are only 128 b. Thus, it is not possible to merge both 128 b accesses in the memory execution unit 470 prior to sending back the full 256 b. Accordingly, each 128 b segment is sent to its corresponding execution stack independently. According to one embodiment, only the last access to execute should initiate a wakeup of dependent micro instructions in RS 410.

In one embodiment, a delay is provided for the wakeup broadcast until the 128 b μop that is last to execute has completed. In such an embodiment, the first component to execute sets its status to ready and the wakeup broadcast is prohibited. The second component to execute checks the status of the other half and enables the wakeup broadcast if the status of the other component is ready.

In one embodiment, when a 128 b load component completes the status of the other 128 b component is checked in a vector tracking register (VTR) 490 register. Further, the status of the completed component is written to VTR 490. This means that when the first component to complete checks VTR 490 for the other half, it will find it not completed and only write its own status without sending a wakeup broadcast. When the second component to complete reads the other component's status in VTR 490 it will find it done and write its status and allows the wakeup broadcast.

The above-described process performs aligned 256 b loads on a base memory system that supports 128 b operations where all of the accessed data is in a single line of cache/memory. However, a further mechanism is needed to account for unaligned load operations where data is split into multiple lines of cache/memory.

An address U is "unaligned" for a load of size S, when U is not a multiple of S. With aligned addresses the memory can be viewed as a sequence of data items of size S. With unaligned addresses two S-sized data items are to be read from memory to assemble the data needed for the unaligned load. In practical terms, supporting unaligned addresses can double the number of memory accesses needed to assemble the data.

As described above, the second 128 b component memory access may be performed before the first 128 b component access. Using the second 128 b component for the first access provides for performance efficiency on 16B unaligned accesses because there is a higher likelihood of accessing a second cache line if memory starting at lower addresses and going towards higher addresses is being accessed.

Figure 5:
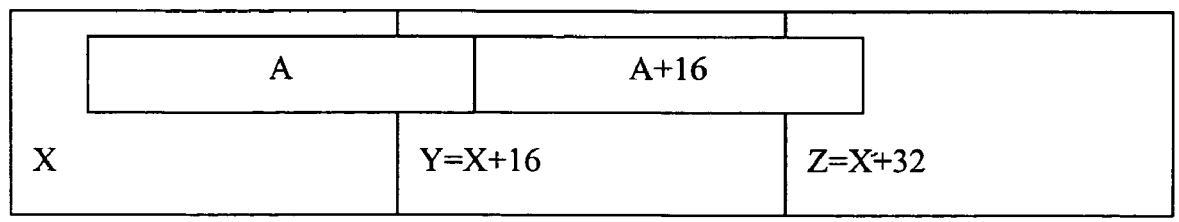
FIG. 5 illustrates one embodiment of a memory device.

Similarly, memory going from higher addresses towards lower addresses is being accessed the first component accesses would be done first for performance on unaligned accesses. Embodiments of the invention reduce the number of memory accesses needed for a unaligned load. FIG. 5 illustrates one embodiment of a memory device. Referring to FIG. 5, addresses A and A+16 are the two unaligned accesses, while addresses X, Y and Z are the aligned 16B chunks of memory that are touched by the 256-bit access.

In one embodiment, when the 256 b load is scheduled from RS 410, AGU 430 outputs A+16 first which means that the first cache (or memory) access first LB is going to retrieve Y from the cache (no rotation is done on 16B accesses). According to one embodiment, a Vector Split Register (VSR) 480 is included to provide buffering. VSR 480 is used for buffering of the address Y 16 byte data chunk and also to allow merging with the addresses X and Z data chunks to form data for addresses A and A+16. The buffers in VSR 480 are allocated as soon as the unaligned access is recognized. As a result, Y will be into VSR 480.

In one embodiment, one VSR 480 register is used for functionality. However, in other embodiments multiple VSR registers may be implemented to allow parallel execution of multiple unaligned load μops.

Note that failure to allocate a VSR buffer will result in the memory operation being performed again. Once the Y chunk is written in VSR 480, the two accesses for A and A+16, are allowed to proceed. The status of VSR 480 is checked along with the access status of the load of A (resulting in chunk X). Chunks X and Y (VSR) will be used to merge the result for address A.

Further, the ADDR+16 LB is rescheduled and will use a +16 B adder (not shown, but in the baseline hardware to support other split load operations) to compute the address for the second access and will read Z (it is accessing the cache with address ADDR+32). On a hit, later in the pipeline the content of the VSR (Y) will be read and a rotator (not shown) is implemented using Y and Z to produce A+16.

Once both accesses are completed, the VSR is freed. Thus, only three memory accesses are implemented per 256 b load, or 6 accesses for a 512 b load. Without embodiments of the invention, the same operations would consume four and eight memory accesses, respectively.

The above-described mechanism provides execution of aligned and unaligned 256 b loads on existing processor hardware with minimal changes and an optimal number of memory accesses.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various emdodiments are not intended to limit the scope of the claims which in themselves recite only those features regarded as essential to the invention.

What is claimed is:

1. A method comprising:
scheduling a load operation having a size larger than a size of a maximum access supported by a memory device; and
executing the load operation as a plurality of separate load operation segments having a size equivalent to or smaller than the maximum access supported by the memory device.

2. The method of claim 1 wherein executing each of the plurality of load operation segments comprises:
computing a first address associated with a first segment of the plurality of load operation segments;
writing the first address into a first load buffer;
computing a second address associated with a second segment of the plurality of load operation segments; and
writing the second address into a second load buffer.

3. The method of claim 2 further comprising:
executing a memory access using the first address; and
executing a memory access using the second address.

4. The method of claim 3 wherein execution of data corresponding to the first segment and data corresponding to the second segment may complete in any order.

5. The method of claim 4 further comprising tracking the status of the second segment after execution of the first segment has been completed at a vector tracking register (VTR).

6. The method of claim 2 further comprising:
detecting that the first address is an unaligned address; and
allocating a vector split register (VSR).

7. The method of claim 6 further comprising:
storing a first component of the first address located in a first memory address range in the VSR; and
rescheduling the first segment.

8. The method of claim 7 further comprising:
incrementing to a second memory address range; and
merging a second component of the first address located in the second memory address range with the first component in the VSR.

9. The method of claim 8 further comprising rotating the first component and the second component in the VSR.

10. A computer system comprising:
a memory device, and
a central processing unit (CPU) having:
a reservation station (RS) to schedule load operations having a size larger than a size of a maximum access supported by the memory device; and
a Memory Execution Unit (MEU) to execute the load operations as a plurality of separate load operation segments having a size equivalent to or smaller than the maximum access supported by the memory device.

11. The computer system of claim 10 further comprising a decoder to receive an instruction and decode the instruction into one or more load micro operations each having a data type size equal to or smaller than the data type size of the instruction.

12. The computer system of claim 11 further comprising an address generation unit (AGU) to compute addresses for the load operations.

13. The computer system of claim 12 wherein the AGU computes a first address associated with a first segment of the plurality of load operation segments, writes the first address into a first load buffer, computes a second address associated with a second segment of the plurality of load operation segments and writes the second address into a second load buffer.

14. The computer system of claim 13 wherein the MEU executes a memory access using the first address and executes a memory access using the second address.

15. The computer system of claim 14 further comprising a vector tracking register (VTR) to track the status of the second segment after execution of the first segment has been completed.

16. The computer system of claim 10 wherein a data type size of the memory device is one half the data type size of the RS and the AGU.

17. The computer system of claim 13 wherein the AGU includes a vector split register (VSR), wherein the AGU detects that the first address is an unaligned address and allocates the first address to the VSR.

18. An article of manufacture including one or more computer readable media that embody a program of instructions, wherein the program of instructions, when executed by a processing unit, causes the processing unit to perform the process of:
scheduling a load operation having a size larger than a size of a maximum access supported by a memory device; and
executing the load operation as a plurality of separate load operation segments having a sire equivalent to or smaller than the maximum access supported by the memory device.

19. The article of manufacture of claim 18 wherein the program of instructions, when executed by a processing unit, further causes the processing unit to perform the process of:
computing a first address associated with a first segment of the plurality of load operation segments;
writing the first address into a first load buffer;
computing a second address associated with a second segment of the plurality of load operation segments; and
writing the second address into a second load buffer.

20. The article of manufacture of claim 19 wherein the program of instructions, when executed by a processing unit, further causes the processing unit to perform the process of:
executing a memory access using the first address; and
executing a memory access using the second address.

21. The article of manufacture of claim 19 wherein the program of instructions, when executed by a processing unit, further causes the processing unit to perform the process of:
detecting that the first address is an unaligned address; and
allocating a vector split register (VSR).

22. The article of manufacture of claim 21 wherein the program of instructions, when executed by a processing unit, further causes the processing unit to perform the process of:
storing a first component of the first address located in a first memory address range in the VSR; and
rescheduling the first segment.

23. A central processing unit (CPU) comprising:
a reservation station (RS) to schedule load operations having a size larger than a size of a maximum access supported by a memory device; and
a Memory Execution Unit (MEU) to execute the load operations as a plurality of separate load operation segments having a size equivalent to or smaller than the maximum access supported by the memory device.

24. The CPU of claim 23 further comprising an address generation unit (AGU) to compute addresses for the load operations.

25. The CPU of claim 24 wherein the AGU computes a first address associated with a first segment of the plurality of load operation segments, writes the first address into a first load buffer, computes a second address associated with a second segment of the plurality of load operation segments and writes the second address into a second load buffer.

* * * * *

UNITED STATES PATENT AND TRADEMARK OFFICE
CERTIFICATE OF CORRECTION

| | |
|---|---|
| PATENT NO. | : 7,457,932 B2 |
| APPLICATION NO. | : 11/323000 |
| DATED | : November 25, 2008 |
| INVENTOR(S) | : Hammarlund et al. |

It is certified that error appears in the above-identified patent and that said Letters Patent is hereby corrected as shown below:

In column 8, claim 18 at line 20 delete, "sire" and insert --size--.

Signed and Sealed this

Eighth Day of December, 2009

David J. Kappos
*Director of the United States Patent and Trademark Office*